Patented Apr. 17, 1934

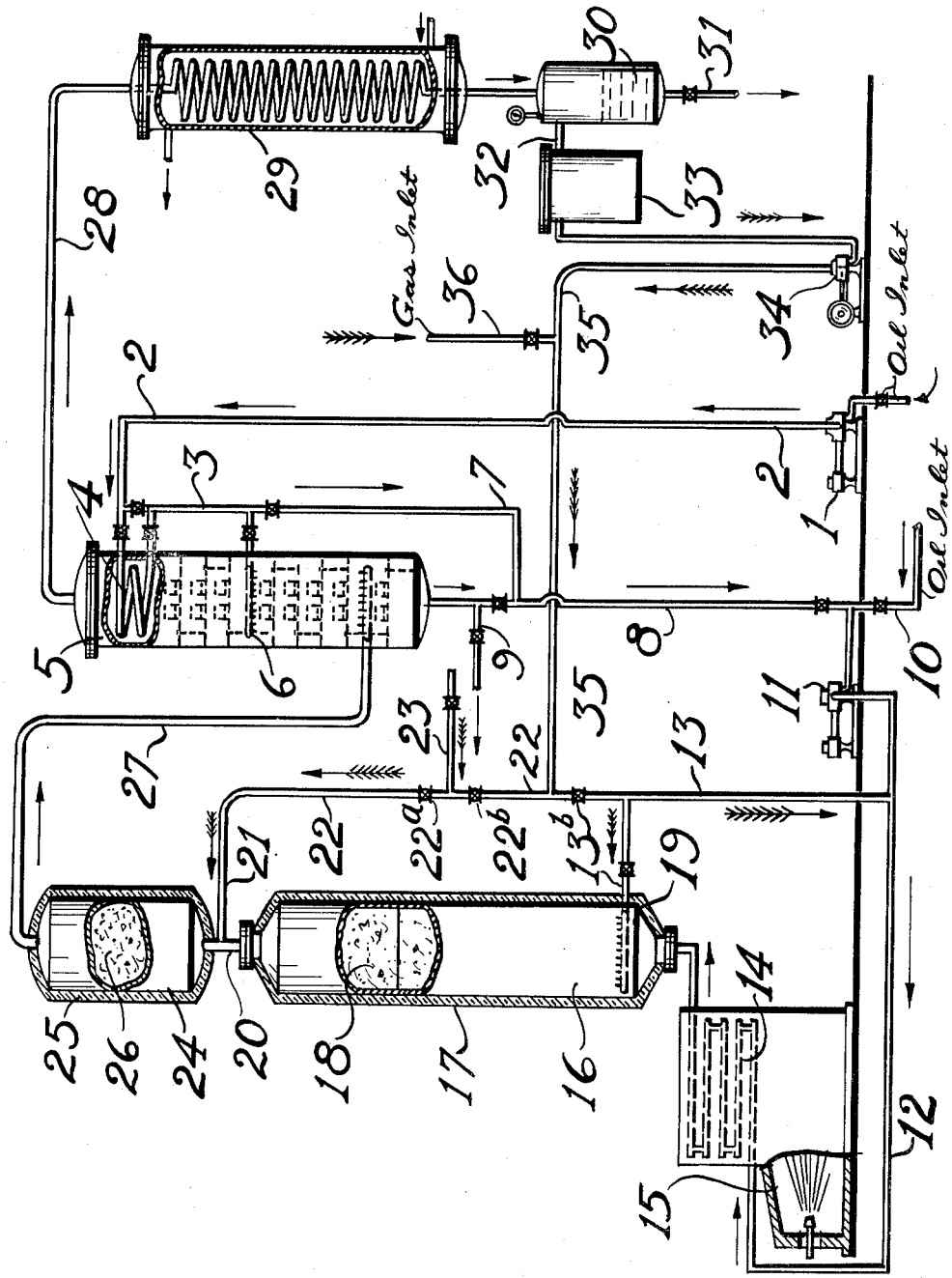

1,955,297

UNITED STATES PATENT OFFICE 1,955,297

PROCESS FOR PRODUCING HIGHLY REFINED MOTOR FUELS FROM HEAVIER HYDROCARBONS

James M. Jennings, Baton Rouge, La., assignor to Standard-I. G. Company

Application September 10, 1930, Serial No. 480,894

7 Claims. (Cl. 196—53)

The present process refers to the manufacture of high grade motor fuel from heavier hydrocarbons by the action of high pressure hydrogen at high temperature and relates specifically to a method whereby the oil is subjected to an additional stage of treatment with hydrogen at a lower temperature. My invention will be fully understood from the following description and drawing which illustrates one form of apparatus which is suitable for my purpose.

The drawing is a diagrammatic view in sectional elevation of an apparatus constructed to carry out my invention and indicates the flow of the materials in the process.

Referring to the drawing, a hydrocarbon oil is fed from any convenient source (not shown) by pump 1 through line 2 to manifold 3. From manifold 3 the oil may be passed through cooling coil 4 located in the top of fractionating tower 5 and/or may be introduced directly into the tower by spray head 6 located at any suitable point therein. If desired, all or part of the oil may be sent through line 7 to line 8 where it joins the unvaporized fractions from the tower. A portion or all of these heavy fractions may be withdrawn by means of connection 9, if desired, or may be drawn off admixed with the oil from line 7 by use of connection 10. Additional oil may be introduced from an external source by 10. Pump 11 discharges the oil from 8 into line 12 where it may mix with a supply of gas rich in hydrogen from pipe 13. The material then flows to heating coil 14 which is mounted in a suitable furnace 15, from which it passes into primary reactor 16.

The reactor is constructed to withstand pressures of 200 atmospheres or more and temperatures in excess of 1000° F. and is provided with suitable insulation 17. The interior of 16 is filled with a suitable catalyst 18, which may be in lump form or supported in any suitable manner. Additional gas may be introduced into reactor 16 by spray head 19 connected with line 13. From 16 the reactants pass to secondary reactor 24 by means of line 20 where their temperature is reduced by addition of a cooling gas from line 21. This gas may be of the same composition as that in line 13, in which case valve 22a in line 22 may be all or partially open. If gas of a different composition is used it may be supplied under pressure by connection 23, in which case valve 22a may be open or closed. Valves 13b and 22b may be used to regulate the relative amounts of gas which are mixed with the oil before passage through reactors 16 and 24 respectively.

Reactor 24 is similar to 16, is provided with insulation 25, and may be packed with a suitable catalyst 26 which may or may not be of the same composition as 18. After flowing through 24 the materials pass out through line 27 to tower 5. Tower 5 is provided with suitable packing, such as Raschig rings, or with bubble-cap plates. The hot oil and gas from 27 flows up through the tower whereby the fractions too heavy for motor fuel are condensed and pass from the bottom of the tower through line 8. The temperature of separation is regulated by control of flow in coil 4 and/or by regulated addition of feed oil by distributor 6.

Motor fuel and gas pass from tower 5 by means of line 28 to cooler 29 and separation drum 30. The condensed product is withdrawn from 30 by pipe 31 while the gas passes from drum 30 by line 32 to purification means 33. This may consist of any suitable means for removing gaseous hydrocarbon from the gas, such as scrubbing with heavy oil. From the purification stage the gas passes to booster compressor 34 which discharges into line 35, which joins lines 13 and 22. Fresh or make-up hydrogen may be added to line 35 by means of connection 36 and/or by connection 23.

When hydrocarbon oils are treated with hydrogen to produce motor fuel of high anti-detonating quality, especially when operation is carried out at extremely high temperatures in order to form an extremely anti-detonating gasoline or blending agent, the fuel produced sometimes possesses minor objectionable characteristics, which, however, are sufficient to prevent the immediate sale of fuel as high quality product. Occasionally particular feed stocks have been found to act in a similar way even at low temperatures. These objectionable characteristics ordinarily comprise insufficient color stability, slight odor, color and gum slightly above specification for high quality product, and other undesirable properties which may be removed by slight treatment with acid, clay, or other suitable refining agents.

I have now found that the latter treatment may be eliminated and the oil freed of the mentioned objectionable characteristics by a special stage of treatment during the hydrogenation operation. I propose to effect this by subjecting the oil on leaving the high temperature hydrogenation reactor to a second stage of treatment with hydrogen at a lower temperature. Under these conditions of lower temperature the hydrogen reacts with the oil from the first stage to render the motor fuel such that it substantially passes all specifications for high grade fuel and may be sold as such without further acid, clay or similar treatment. In the following description in which I fully describe my process, the first stage of the operation, in which the hydrocarbon oil is treated with hydrogen at higher temperatures to form anti-detonating fuel, will be referred to as the primary, reaction zone and the process as a hydroforming or hydrocycliforming process. The subsequent stage in which the oil is treated with hydrogen at lower temperature to improve the qualities referred to above, will be known as the secondary reaction zone and the process one of hydrofining.

In the operation of my process the feed oil may consist of hydrocarbon oils such as reduced crudes and preferably distillates such as gas oil, heavy naphtha, refined oils or even unfinished gasolines. The feed oil is first preheated preferably in a coil in mixture with hydrogen, and then discharged into an insulated primary catalytic reactor. The materials are heated sufficiently in the coil to maintain the desired temperature in the insulated reactor. If desired, several primary reactors may be operated in series or parallel. The temperature in the primary reaction zone is maintained above 900° F. and preferably in the range from 930 to 1030° F. During passage through this zone the hydrogen and oil react in the presence of the catalyst to produce low boiling oils of great value as anti-detonating motor fuel. The hydrogen is passed through the primary reactor only in sufficient excess to prevent the formation of tarry or asphaltic materials. It is preferable to employ about 1000 to 3000 cubic feet of gas for each barrel of oil passing through the primary reaction zone, although more or less than this may be used.

After passing through the primary zone the mixture of oil and gas flow to the secondary reaction zone which may comprise one or more reactors connected in series or parallel where the oil is allowed to react with the hydrogen at a lower temperature in the presence of a catalyst: whereby the low boiling oils are improved as to color, color stability, odor, gum, and the like. The secondary zone is maintained at a temperature below about 900° F. and preferably between about 600 and 800° F. although temperatures as low as 450° F. may be employed. Any suitable means may be used to reduce the materials leaving the primary zone to the temperature of the secondary zone. For example I may introduce a regulated amount of cold gas into the secondary zone, such as hydrogen, nitrogen, methane, steam, or mixtures of these. In many cases, I find it preferable to use hydrogen or mixtures containing hydrogen for this purpose since it is usually desirable to employ a greater excess of hydrogen with the oil in the secondary reactor than in the primary. For example, I may use about 4000, 6000, or even 10,000 cubic feet per barrel of oil. The hydrogen gas which is supplied to the process to make up for that consumed may advantageously be introduced into the secondary reaction zone. Other means may be employed to lower the temperature of the materials leaving the primary reaction zone, such as passage through heat exchangers, water or air coolers and the like.

On leaving the secondary reactor, the materials may be cooled to separate the gas and oil or the mixture may be sent to a separation stage in which the heavier fractions of the oil preferably those too heavy for motor fuel are removed. These heavy fractions may be returned to the reaction zone for retreatment or may be withdrawn from the process for other suitable purposes.

Catalysts of different composition may be used in the primary and secondary reaction zones. In general, however, these catalysts may contain the oxides and/or sulfides of such materials as chromium, molybdenum, or tungsten, their mixtures with each other or with other compounds, such as alkaline earths, zinc oxide, magnesia, or alumina. The catalyst may be in lump form and packed into the reactor as such, or it may be supported upon trays or other suitable surfaces within the reactor.

The catalytic reactors are maintained under pressure above 20 atmospheres and ordinarily in excess of about 100 to 200 atmospheres. The feed rate to the primary reaction zone is expressed in terms of the volume of the primary reactor or reactors, and is ordinarily held above about 1.0 volumes of oil per volume of reaction drum per hour and preferably about 2.0, 3.0 or more volumes per volume per hour. The volume of the secondary reaction zone is generally somewhat less than that of the primary zone, though in certain cases, especially where the lower range temperatures are employed in the secondary zone, it may be larger than the primary zone.

My invention is not to be limited by any theory of the mechanism of the reactions nor to any specific example which may have been given for purpose of illustration, but only by the following claims in which I wish to claim all novelty inherent in my invention.

I claim:

1. An improved process for producing highly refined motor fuel from heavier petroleum fractions comprising passing the oil with free molecular hydrogen at a temperature above 900° F. and under pressure of at least 20 atmospheres through a primary reaction zone packed with a catalyst of the type immune to sulphur poisoning, the volume of hydrogen and the time of treatment being adapted to convert a substantial part of the heavier oil to a low boiling oil endowed with valuable anti-detonation properties and comprising unstable constituents without formation of tarry or asphaltic materials, then passing such fractions at the same pressure but under increased hydrogen partial pressure through a secondary reaction zone packed with a catalyst of the type immune to sulphur poisoning maintained at a temperature below 900° F., the time of treatment being sufficient only to effect a purification of the light oil without elimination of its anti-detonation properties.

2. A process according to claim 1 in which the volume of hydrogen in the first stage is from about 1,000 to 3,000 cubic feet per barrel of oil.

3. A process according to claim 1 in which the volume of hydrogen in the first stage is from about 1,000 to 3,000 cubic feet per barrel of oil and that in the second from about 4,000 to 10,000.

4. Process according to claim 1 in which the volume of oil in the second stage is from about 4,000 to 10,000 cubic feet per barrel of oil and the temperature in the second stage is below about 800° F.

5. An improved process for producing highly refined oil suitable for motor fuel from heavy petroleum distillates, which comprises passing the oil with free molecular hydrogen first through a primary reaction zone packed with a catalyst of the type immune to sulphur poisoning and maintained at a temperature above 900° F. while under pressure of at least 100 atmospheres, the volume of hydrogen and the time of treatment being adapted to convert a substantial portion of the heavier oil to a lower boiling oil suitable for motor fuel and possessing marked anti-detonation properties and comprising unstable constituents without formation of tarry or asphaltic materials, then passing the said oil through a second reaction zone packed with a catalyst of the type immune to sulphur poisoning, maintained at a temperature between the limits of 450° and 900° F. under substantially the same pressure but under an increased partial pressure of hydrogen, the time being adapted to bring about a high degree of refinement without further conversion or elimination of its anti-detonation properties.

6. An improved process for producing highly refined motor fuel of high anti-detonation value from petroleum distillates, comprising passing such distillate through a catalytic reaction zone packed with a catalyst of the type immune to sulphur poisoning and maintained at a temperature above 900° F. while under pressure above 100 atmospheres, and with an effective quantity of free molecular hydrogen not in excess of about 3000 cubic feet per barrel of oil, time of treatment being adapted to convert a substantial part of the feed oil into a lower boiling product endowed with anti-detonation properties and comprising unstable constituents without formation of tarry or asphaltic materials, then immediately passing the lower boiling product through a second reaction zone packed with a similar catalyst at a temperature between 450° and 900° F. under pressure in excess of 100 atmospheres and with an increased amount of hydrogen, the time of contact and the hydrogen pressure being adapted to produce a highly refined product without additional decomposition or elimination of its anti-detonation properties.

7. A process for producing finished motor fuel from high-boiling petroleum distillates, which comprises destructively hydrogenating a high boiling oil in a primary reaction zone packed with a catalyst immune to sulphur poisoning, maintained at a temperature above 900° F. under pressure of the order of 200 atmospheres, the amount of free hydrogen being within the range of 1000 to 3000 cubic feet per barrel of oil the time of treatment being adapted to convert a substantial part of the high boiling oil into a lower boiling product endowed with anti-detonation properties and comprising unstable constituents without formation of tarry or asphaltic materials, then hydrogenating the product produced therefrom at a temperature between 600° and 800° F. under the same pressure conditions under the influence of a catalyst immune to sulphur poisoning with a volume of hydrogen in excess of 4000 cubic feet per barrel of oil and providing reaction time adapted to secure complete refinement without additional conversion or elimination of its anti-detonation properties.

JAMES M. JENNINGS.